US010210525B2

(12) United States Patent
Vadura et al.

(10) Patent No.: US 10,210,525 B2
(45) Date of Patent: Feb. 19, 2019

(54) QR SYSTEM FOR BUSINESS CARDS

(71) Applicants: Dennis Vadura, Trabuco Canyon, CA (US); Wei Kang Tsai, Irvine, CA (US); Timothy Hayden Nelson, Orange, CA (US)

(72) Inventors: Dennis Vadura, Trabuco Canyon, CA (US); Wei Kang Tsai, Irvine, CA (US); Timothy Hayden Nelson, Orange, CA (US)

(73) Assignee: Badu Networks, Irvine, CA (US)

( * ) Notice: Subject to any disclaimer, the term of this patent is extended or adjusted under 35 U.S.C. 154(b) by 341 days.

(21) Appl. No.: 14/657,928

(22) Filed: Mar. 13, 2015

(65) Prior Publication Data

US 2016/0267488 A1 Sep. 15, 2016

(51) Int. Cl.
*G06Q 30/00* (2012.01)
*G06Q 50/00* (2012.01)

(52) U.S. Cl.
CPC ............ *G06Q 30/01* (2013.01); *G06Q 50/01* (2013.01)

(58) Field of Classification Search
USPC .......................................................... 235/494
See application file for complete search history.

(56) References Cited

U.S. PATENT DOCUMENTS 8,573,499 B1 * 11/2013 Boyle .............. G06K 19/06037 235/375
2013/0043302 A1 * 2/2013 Powlen ............. G06F 17/30725 235/375
2015/0254549 A1 * 9/2015 Newcombe .......... G06K 19/083 235/493

* cited by examiner

*Primary Examiner* — Rafferty Kelly

(57) ABSTRACT

A method and system to digitize printed information on a business card and to link the digitized data to a social networking service, referred to as a Meeting-Spot (or simply an MSP) service, employs quick response codes (QRCs) to uniquely identify business cards printed with a QRC. An online MSP service offers a free MSP app, which is installable on mobile devices. The MSP service will offer a plurality of MSP business cards to its members. A QRC image is printed on at least one side of an MSP business card. Further, the data encoded in the QRC on an MSP business card comprise at least an identifier to uniquely identify a business card. The identifier encoded in the QRC printed on an MSP business card may be a UUID (universal unique identifier), which complies with the identifier standard set by the Open Software Foundation (OSF). Optionally, the identifier is replaced by a proprietary hash code that can uniquely identify a business card.

7 Claims, 3 Drawing Sheets

QR SYSTEM FOR BUSINESS CARDS

CROSS REFERENCES TO RELATED APPLICATIONS

The present Application claims priority to U.S. Provisional Patent Application No. 61/952,748 entitled QR SYSTEM FOR BUSINESS CARDS, filed on Mar. 13, 2014, which is hereby incorporated by reference in its entirety.

FIELD OF THE INVENTION

The present invention relates in general to business cards, customer relation management (CRM), and social networking, and in particular, to methods for managing contacts through business cards and a social-networking service.

BACKGROUND OF THE INVENTION

Barcodes are printed digital codes that comprise data. A 2-D (2-dimensional) barcode is a QR (quick response or quick reader) code, a Data Matrix, or a Microsoft Tag, or any barcode that can be decoded as a digital image. Today, 2-D barcodes such as QR codes are popular as they provide a quick means to uniquely identify an object of all types: device, organization, brand name, trademark, website, product, service, user, etc. The types of the object are practically unlimited.

One application of QR codes is to uniquely identify a business card. For many professionals, it is important to keep and manage a large number of business cards for job-related purposes. However, it is a tedious task to manually enter the contact information on just a few business cards. A simple solution is to scan a business card with a scanner or a camera to convert printed words into digital data through OCR (optical character recognition) software.

But most OCR software has a high error rate in reading contact information on business cards. One problem is that the printed fonts in business cards are often artistically designed—it is impossible to design an OCR algorithm to correctly decode all possible designs. Therefore, the OCR approach has a fundamental limitation.

While there were proposals to replace paper business cards (BCs) with digital cards, they have not been successful. In many societies, giving a BC with a proper gesture is an important part of the culture—this is unlikely to change. Therefore, there is a need for digitizing contact information on BCs and transferring them to a computing device.

The problem of inaccurate OCR scanning will disappear if the scanned image is a low-error QRC (QR code) image. Such a QRC is encoded with high redundancy that the image can be decoded practically without error. Printing a low-error QRC on a business card will allow unique and error-free identification of the business card. Further, the QRC image itself may comprise data associated with the business card.

Digitizing contact information on business cards is only a small part of the overall contact-related activities for a professional. Especially in sales and marketing, it is important to maintain a large and active social network for business development.

Today, LinkedIn is a successful professional networking service. However, LinkedIn is not a service that utilizes business cards effectively. The LinkedIn service allows a professional to be visible to a large community. Its service is a "pull" model in which organizations or individuals pull information from the service regarding a particular professional. However, there is also a need for a "push" model in which an individual pushes messages to a group of selected contacts. For enterprises, the push model is actually available as a part of many commercial CRM services. However, there are no push-model services for an individual to manage his contact activities.

Therefore, there is a need for a professional networking service that utilizes QRCs to automate data entry for business cards. The needed service should also allow a push-model service for an individual to manage contact-related activities.

BRIEF SUMMARY OF THE INVENTION

Aspects of the present invention relate to methods and systems for digitizing printed information on business cards, and coupling that with the management of contact databases thorough a social-networking service, via QR codes printed on a business card.

In accordance with one aspect of the present invention, the use of QR codes is exemplary and not limiting. Any 2-D barcode can be used for identifying a business card.

In accordance with one aspect of the present invention, a social networking service is linked to business cards printed with a QR code. The data encoded in the QR code may comprise a UUID (universal unique identifier) that uniquely identifies a business card at a social-networking service. The data encoded in the QR code on a business card may also comprise a company ID that uniquely identifies the company or organization, whose name is printed on the card. Alternatively, a business card is uniquely identified by a proprietary hash code, rather than a UUID code.

In accordance with one aspect of the present invention, a social networking service keeps a database of business cards printed without a QR code. The social networking service uses a hash code to uniquely identify such a business card; the business card data stored in the database may be expressed in the format: <hash code, BC data>.

BRIEF DESCRIPTION OF THE DRAWINGS

The above and other objects and features in accordance with the present invention will become apparent from the following descriptions of embodiments in conjunction with the accompanying drawings, and in which.

DETAILED DESCRIPTION OF EXEMPLARY EMBODIMENTS

Figure 1:
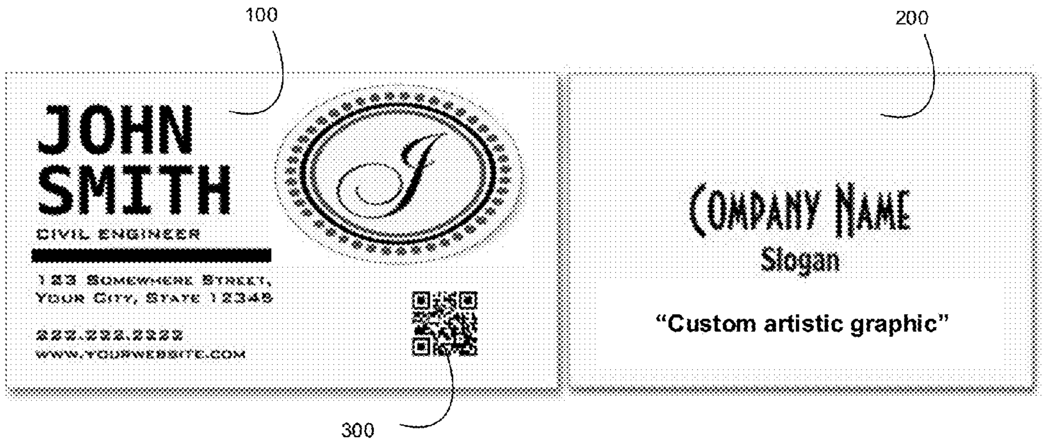
FIG. 1 is a simplified illustration that shows a business card wherein a QRC is printed on a side (surface) wherein there are printed words, in accordance with an embodiment of the present invention.

A method and system to digitize printed information on a business card and to link the digitized data to a social networking service, referred to as a Meeting-Spot (or simply an MSP) service, employs quick response codes (QRCs) to uniquely identify business cards printed with a QRC.

In accordance with one aspect of the present invention, an online MSP service offers a free MSP app, which is installable on mobile devices. The MSP service will offer a plurality of MSP business cards to its members. A QRC image is printed on at least one side of an MSP business card. Further, the data encoded in the QRC on an MSP business card comprise at least an identifier to uniquely identify a business card.

In accordance with one aspect of the present invention, the name Meeting-Spot or MSP is exemplary and is not limiting for naming the social-network service. Further, the use of QR codes is exemplary and not limiting—any 2-D barcode may be used for identifying a business card.

Most business cards today are not folded and they have only 2 sides (surfaces). Some business cards are folded; some have 2 folds, while others have 3 folds. A folded BC may have 4, 5, or 6 sides. In an unfolded BC, the front side usually displays contact information of the cardholder, while the second side may be blank. In a folded BC, some sides may be printed while other sides may be blank.

In accordance with one aspect of the present invention, a QRC image is printed on at least one side of an MSP business card. On an MSP business card, a QRC image may be printed on a side with no other printed information.

In accordance with one aspect of the present invention, the users of an MSP service are divided into free-service and premium-service members. The premium-service members are those who pay a fee for the value-added part of the MSP service. Corporations may also purchase a group membership for their employees.

In accordance with one aspect of the present invention, the identifier encoded in the QRC printed on an MSP business card may be a UUID (universal unique identifier), which complies with the identifier standard set by the Open Software Foundation (OSF). Optionally, the identifier is replaced by a proprietary hash code that can uniquely identify a business card.

The data encoded in the QRC, which is printed on an MSP business card, may further comprise a company-ID, which identifies the company or organization whose name is printed on said MSP business card.

In accordance with one aspect of the present invention, an MSP service maintains a contact database, in which an individual data item in the database is referred to as a contact data item. Further, each contact data item corresponds to a unique business card, and comprises at least the name of the cardholder of a business card, the name of the company or organization printed on the said business card, and contact information printed on the said business card.

In accordance with one aspect of the present invention, an MSP app installed on a mobile device maintains a local database of contact data items for a member of the MSP service. In addition, a contact data item stored at said local database in a mobile device is similar to a contact data item stored in the database at said MSP service. A contact data item stored by the MSP app may further comprise additional personal notes or other information, which is not stored in the corresponding contact data item stored at the MSP service.

In a contact database, which is stored either at an MSP service or in a mobile device by an MSP app, a contact data item may further comprise additional information supplied by the MSP service, or by a member of the MSP service.

In accordance with one aspect of the present invention, an MSP app is also used to scan non-MSP business cards; consequently, a scanned non-MSP business card is assigned a hash code by said MSP app. The scan result, which comprises digitized contact information from said non-MSP card, is forwarded to the MSP service to be stored as a new or updated contact data item.

In accordance with one aspect of the present invention, a new member is offered to receive a free deck of MSP business cards.

In accordance with one aspect of the present invention, when a new contact data item is entered into the contact database at an MSP service, the unique cardholder indicated in the new contact data item receives an email offer to join the MSP service.

In accordance with one aspect of the present invention, an MSP member is allowed to specify a criterion through an MSP app to generate a list of contacts, according to said specified criterion. The criterion may include, but is not restricted to the following list: industry sector, name or type of a religious organization, name or type of a tradeshow, name or type of a product or service, location region of a premise, or any user-specified set of key words.

Further, a MSP member is allowed to modify the list of contacts generated by an MSP app, which satisfies the criterion he specified.

In accordance with one aspect of the present invention, an MSP app enables an MSP member to use a list of contacts, generated by an MSP app, to send emails, to make phone calls, or to post to a social media.

In accordance with one aspect of the present invention, there are 3 exemplary workflows for a new member to sign up for an MSP service, and 3 exemplary workflows for a member to reap benefits from an MSP services. These workflows are specified below as Workflows A, B, C, D, E and F. These workflows are exemplary—those skilled in the art will appreciate that these workflows may be varied without deviating from the spirit of the original workflows. Adding steps, subtracting steps, simple reordering, or slight variations of the steps, may generate a workflow that is still within the scope of the present invention.

Workflow A (to sign up for an MSP service):

1. A new member signs up via an MSP site or an MSP app on a mobile device

2. The new member creates a personal/company account for the MSP service

3. The new member requests a free deck of MSP BCs from the MSP service

In accordance with one aspect of the present invention, Workflow A is a basic procedure to sign up for a free MSP membership. In step 2, as an option, a new member may have to enter additional personal information such as the industry of the company that he works for, a brief description of the job that he holds, etc. In step 2, a new member may also set the security and privacy settings for his private account—these settings regulate the situations under which his personal information can be released.

Workflow B (to sign up for an MSP service):

1. A non-member takes one of his own non-MSP business cards

2. The non-member uses the MSP app on his mobile device to scan the BC

3. The MSP app shows and highlights potential errors on the scanned result

4. The MSP app prompts the non-member to correct the scanned result

5. The non-member signs up for the MSP service

6. The MSP app prompts the new member to select a deck of free MSP BCs

7. Optionally, the MSP app prompts the new member to input additional data

In accordance with one aspect of the present invention, Workflow B is an alternate procedure to sign up for a free MSP membership. In Workflow B, the new member utilizes an OCR technology to scan a non-MSP business card. Therefore, the new member doesn't have to enter his contact data; however, he has to correct the OCR scan result.

Workflow C (to sign up for an MSP service):

1. A non-member takes an MSP BC from a contact
2. The non-member uses an MSP app to scan the QRC image on the BC
3. The MSP app sends the scan (decoded) result to the MSP service
4. The MSP service sends the contact data stored in its database, corresponding to the scan result received, back to the MSP app
5. The MSP app displays the contact data received from the MSP service
6. The non-member signs up as a new member
7. If permitted, the MSP app adds the newly scanned contact to the contact databases in the mobile device and in the member's account at the MSP service
8. Optionally, the MSP asks the new member to input additional information In accordance with one aspect of the present invention, Workflow C is a third procedure to sign up for an MSP membership. The key difference between Workflow C and Workflow B is in the scanned business card. In Workflow C, the new member use a mobile device to scan an MSP business card and he reaps a benefit of the MSP service immediately—the MSP BC is scanned without error and the contact data on the business card can be added to his contact databases with ease.

Workflow D (to reap benefits from an MSP service):

1. A member of an MSP service uses an MSP app to scan a non-MSP BC
2. The MSP app produces a hash code for the newly scanned BC
3. The MSP app uses the hash code to look up the same hash code in the MSP database
4. If the hash code is not stored in the MSP database, the MSP app uploads the scan result (contact data) with the hash code to the MSP service
5. The MSP service adds the new contact data, with the hash code, to the MSP database
6. The new contact gets an email from the MSP service, inviting the new contact to join the MSP service, optionally with an offer of free MSP BCs In accordance with one aspect of the present invention, Workflow D is a basic procedure for an MSP member to benefit from scanning non-MSP BCs. Workflow D is also a means by which an MSP service grows its membership in a viral way.

An MSP service may grow virally for a simple reason—the larger the membership of an MSP service, the higher is the chance for a member to get an MSP business card. As it is simpler to digitize an MSP business card, every free-service member would like to invite almost everyone to join for a free MSP service.

In accordance with one aspect of the present invention, each time an MSP member scans a non-MSP business card, the OCR scan result is sent to the MSP service. The MSP service keeps a database of the received contact data. In the database, each non-MSP business card is linked to a unique hash code. Consequently, non-MSP business card data can be searched via the hash codes.

In accordance with one aspect of the present invention, an MSP service may employ an algorithm to auto-correct the received scanned BC data. If an MSP service receives inconsistent scan results for one business card, an auto-correction algorithm may be used to produce the best digital version of the BC data. Optionally, a member may correct scanned data with manual inputs, before the data are uploaded to an MSP service.

Workflow E (to reap benefits from an MSP service):

1. A member of an MSP service uses an MSP app to scan the QRC on an MSP BC
2. The MSP app sends the scanned QRC result to the MSP service
3. The MSP service sends the contact data stored in its database, based on the received scan result, back to the MSP app
4. If permitted, the MSP app adds the newly scanned contact to the databases in the mobile device and in the member's account at the MSP service In accordance with one aspect of the present invention, Workflow E is a procedure for an MSP member to benefit from scanning MSP BCs.

Workflow F (to reap benefits from an MSP service):

1. A member of an MSP service specifies a criterion to select a group of his contacts via an MSP app
2. The MSP app generates a list of contacts according to the criterion set by the member
3. The member modifies the list by adding or subtracting some contacts
4. The member sends an email, or makes a phone call, or send a social-media message, to various contacts on the list, via the MSP app In accordance with one aspect of the present invention, Workflow F is a procedure for an MSP service to provide a push-model service to a member.

FIG. 1 is a simplified illustration that shows an MSP business card wherein a QRC image 300 is printed on the front side 100, wherein there are other printed words, in accordance with an embodiment of the present invention. The backside 200 is the second side of the business card, wherein there is artistic graphics or other printed information.

Figure 2:
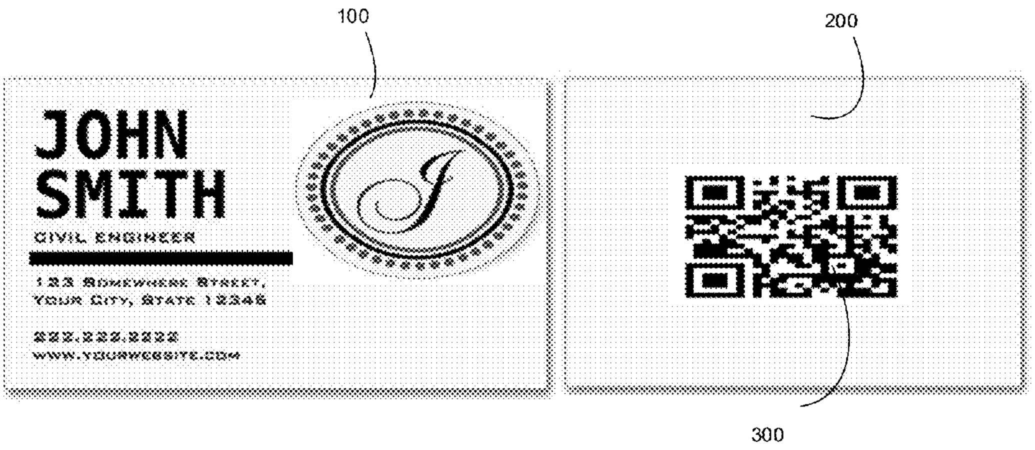
FIG. 2 is a simplified illustration that shows a business card wherein a QRC is printed on one side wherein there is no other printed information, in accordance with an embodiment of the present invention.

FIG. 2 is a simplified illustration that shows an MSP business card wherein a QRC image 300 is printed on the backside 200 wherein there is no other printed information, in accordance with an embodiment of the present invention. In this illustration, there are no QRC images printed on the front side 100.

Figure 3:
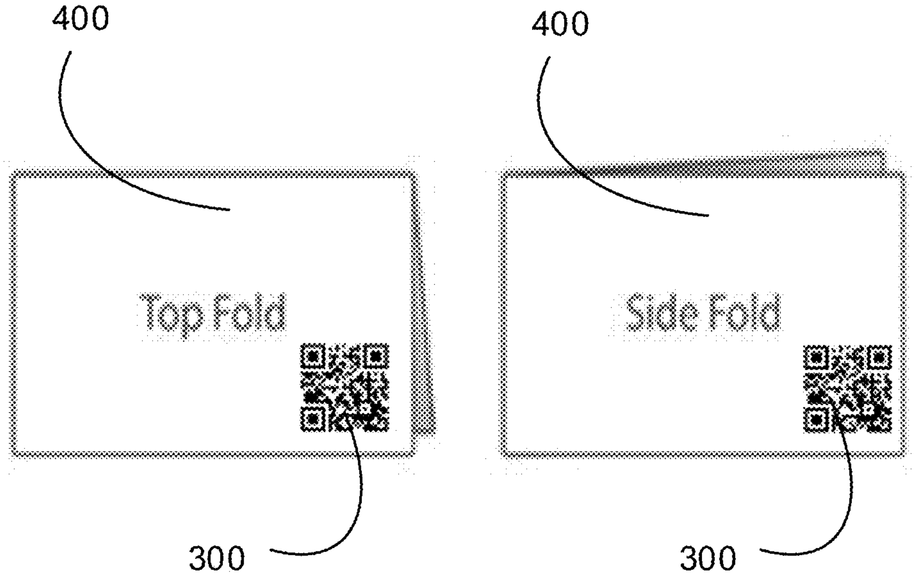
FIG. 3 is a simplified illustration that shows a folded business card wherein a QRC is printed on one side, in accordance with an embodiment of the present invention.

FIG. 3 is a simplified illustration that shows 2 folded MSP business cards wherein a QRC image 300 is printed on side 400, in accordance with an embodiment of the present invention. In FIG. 3, the folded BC on the left is top-folded, and the folded BC on the right is side-folded.

In the foregoing specification, the invention has been described with reference to specific exemplary embodiments thereof. It will, however, be evident that various modification and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A machine-implemented social networking service method comprising:

providing an online social networking service;

providing to a user of the service an app for using the service;

maintaining with the service an online account for the user;

maintaining with the service an online contact database within the online user account;

maintaining with the app an on-device contact database in a mobile communication device, the on-device database storing the user's contact information at the device exclusively for the service;

reading with the app a 2-D barcode image on a business card, wherein the barcode is a unique identifier for the business card and is encoded without additional data, and the business card is a single-purpose card bearing contact information about an individual and/or a business entity; and adding via the user a new contact to the online contact database, the new contact indicated by the read 2-D barcode.

2. The method of claim 1, wherein the 2-D barcode on the business card is printed on a surface of the business card, the surface containing other printed words in addition to the barcode.

3. The method of claim 1, further comprising: the service adding information, which is supplied by the service and in addition to the information obtained from a business card and/or the user, to a contact item in the online database and/or the on-device database, wherein the business card is a single-purpose card bearing contact information about an individual and/or a business entity.

4. The method of claim 1, further comprising: offering business cards without charge from the service to an individual for joining the service as a user.

5. A machine-implemented social networking service method comprising:

providing an online social networking service;

providing to a user of the service an app for using the service;

maintaining with the service an online account for the user;

maintaining with the service an online contact database within the online user account;

maintaining with the app an on-device contact database in a mobile communication device, the on-device database storing the user's contact information at the device exclusively for the service;

reading with the app a 2-D barcode image on a business card, wherein the barcode is a unique identifier for the business card and is encoded without additional data, and the business card is a single-purpose card bearing contact information about an individual and/or a business entity;

adding via the user a new contact to the online contact database, the new contact indicated by the read 2-D barcode;

and the service adding information, which is supplied by the service and in addition to the information obtained from a business card and/or the user, to a contact item in the online database and/or the on-device database, wherein the business card is a single-purpose card bearing contact information about an individual and/or a business entity.

6. The method of claim 5, wherein the 2-D barcode on the business card is printed on a surface of the business card, the surface containing other printed words in addition to the barcode.

7. The method of claim 5, further comprising: offering business cards without charge from the service to an individual for joining the service as a user.

* * * * *